US012238083B2

(12) United States Patent
Pearce

(10) Patent No.: US 12,238,083 B2
(45) **Date of Patent: *Feb. 25, 2025**

(54) METHOD OF DETECTING INCOMPLETE ELECTRONIC RECORD SETS USING SEQUENTIAL NUMBERING

(71) Applicant: William Michael Pearce, Toronto (CA)

(72) Inventor: William Michael Pearce, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,459

(22) Filed: Mar. 5, 2023

(65) Prior Publication Data

US 2023/0262040 A1 Aug. 17, 2023

Related U.S. Application Data

(63) Continuation-in-part of application No. 16/399,321, filed on Apr. 30, 2019, now Pat. No. 11,601,440.

(51) Int. Cl.
*H04L 9/40* (2022.01)
*G06F 16/21* (2019.01)

(52) U.S. Cl.
CPC ............ *H04L 63/08* (2013.01); *G06F 16/219* (2019.01); *H04L 63/123* (2013.01); *H04L 63/126* (2013.01); *H04L 63/1416* (2013.01); *H04L 63/1466* (2013.01); *H04L 63/1483* (2013.01)

(58) Field of Classification Search
CPC . H04L 63/126; H04L 63/123; H04L 63/1416; H04L 63/1483; H04L 51/22; G06F 16/219
See application file for complete search history.

(56) References Cited

U.S. PATENT DOCUMENTS 6,032,258 A * 2/2000 Godoroja ............. H04L 63/123 380/278
2007/0143407 A1* 6/2007 Avritch ................. H04L 63/123 709/206
2013/0324085 A1* 12/2013 Fratti .................... H04L 63/126 455/411
2014/0006778 A1* 1/2014 Dixon .................. H04L 63/123 713/168

* cited by examiner

*Primary Examiner* — Nam T Tran
(74) *Attorney, Agent, or Firm* — Elias C. Borges

(57) ABSTRACT

Herein is disclosed a method of verifying the authenticity of text messages sent from a sender to a recipient. The text messages each having a sender's address and a user-accessible field for receiving content. The content of the user-accessible field is visible to the recipient upon opening the text message in the second text message application. The method includes the steps of identifying the receiver for a message to be sent by the sender, generating a current sequence marker for the receiver, inserting the current sequence marker into the user-accessible filed of the text message, and then s ending the message. The current sequence marker represents a next sequence identifier in a sequence of text messages between the sender and the receiver.

8 Claims, 1 Drawing Sheet

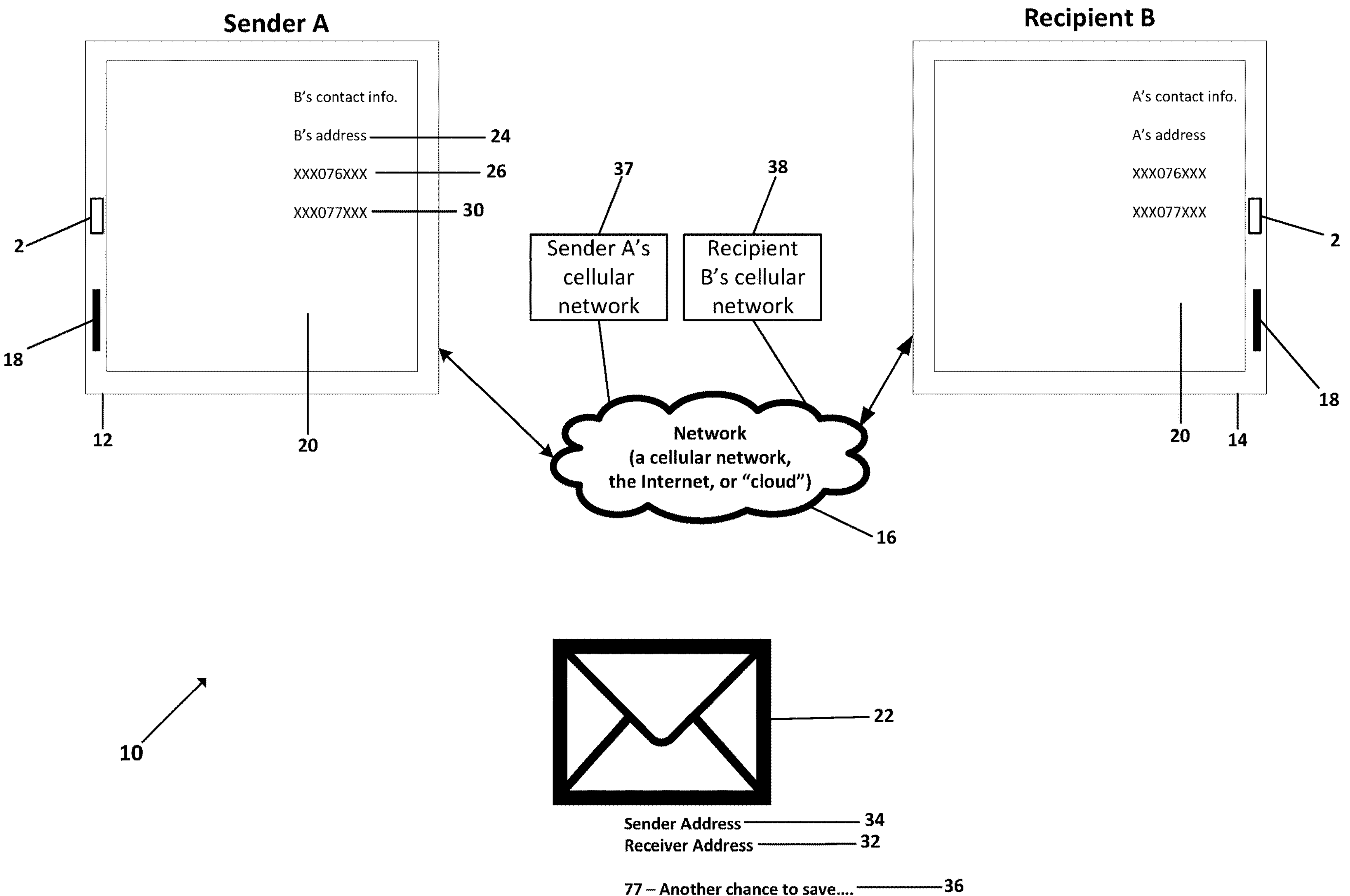
Sender A
B's contact info.
B's address
XXX076XXX
XXX077XXX
24
26
30
2
18
12
20
37
38
Sender A's cellular network
Recipient B's cellular network
Network
(a cellular network,
the Internet, or "cloud")
16
Recipient B
A's contact info.
A's address
XXX076XXX
XXX077XXX
2
18
20
14
10
22
Sender Address
34
Receiver Address
32
77 – Another chance to save....
36

METHOD OF DETECTING INCOMPLETE ELECTRONIC RECORD SETS USING SEQUENTIAL NUMBERING

CROSS-REFERENCE TO RELATED APPLICATION

This is a continuation-in-part of U.S. application Ser. No. 16/399,321 filed Apr. 30, 2019, the entirety of which is incorporated herein by reference.

BACKGROUND OF THE INVENTION

Humans have been numbering book pages for a very long time. Numbering book pages using an alphanumeric sequence assures the reader that all information has been received, and has been received in the correct order. Similarly, numbering other data elements in electronic records would help data providers and data receivers identify whether all information in a sequence has been received, and in the correct order. There are four information systems which benefit from ensuring that information received is complete and in the correct order: (i) text messages, (ii) health records, (iii) social media network messages, and (iv) financial transactions, including e-commerce transactions.

It is beneficial for data providers of all kinds to assist their client bases with ensuring all data in a sequence of data transmissions has been received, has been received in the correct order, and that extraneous information has not been received and intermingled with the intended data transmission. An innovation that would assist in identifying potential missing and/or extraneous information in sequence of data transmissions would be a benefit for text messaging service providers, health care, social media networks and finance industries.

SUMMARY OF THE PRESENT INVENTION

The present invention overcomes the disadvantages of the prior art by providing a method of verifying the completeness and order of data transmitted in a sequence from a data provider to a data receiver by verifying the sequential history of the data elements.

Text messages each have a destination address (GSM Specification #23.040) and a user-accessible field such as the user data. The method of the present invention includes the steps of identifying the receiver for a text message to be sent by the sender and then generating a current sequence marker for the receiver. The current sequence marker represents a next predicted sequence identifier in a sequence of text messages between the sender and receiver. For example, if the sequence of messages between the sender and receiver includes 76 messages and the sequence marker is configured to be a numeric integer, then the last sequence identifier used would be 76 and the next sequence identifier (76+1 or 77) would result in the current sequence marker being 77. However, if the sequence identifiers comprise alphabetical characters (AA, AB, AC, etc.) and the last sequence identifier used was AG, then the next predicted sequence identifier would be AH, hence the current sequence marker would be AH. The next step in the method is to insert the current sequence marker into the user-accessible field of the text message and then send the message to the recipient. Preferably the sequence marker is formed from a sequence of alphanumeric characters which are human readable. Health records, social media network messages and records of financial transactions, including e-commerce transactions, would similarly benefit from sequential numbering.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 1 is a schematic view of the system of the present invention showing the system of the present invention being used to send a text message from a Sender A to a Recipient B.

In the drawings like characters of reference indicate corresponding parts in the different figures.

DETAILED DESCRIPTION OF THE INVENTION

Referring to FIG. 1, the system of the present invention, shown generally as item 10, consists of two text-messaging-capable computing devices 12 and 14 in communication with each other via a network 16. Network 16 could be a telecom network, but preferably network 16 is a cellular telecom network.

Network 16 is configured to facilitate Text Messaging using 3GPP TS 23.040 or other standards or proprietary methods of transporting text messages, that can send Sender A's message 22 to Sender A's cellular network 37. Sender A's cellular network 37 then forwards Sender A's message 22 via Network 16, again using standards or proprietary methods of transporting text messages, to Recipient B's cellular network 38, where it may reside or be made available via network 16 to Recipient B's text message application 18 via Network 16 using standards or proprietary methods for transporting text messages.

Data source 20 contains data about text messages and also contains data about the history of previously sent text messages. It is essential that data source 20 contains the contact information of recipients and be operative for the storage and retrieval of sequence identifier 26 for each recipient.

Within the present invention, data source 20 could be operative in several forms, including (i) a traditional relational database such as Microsoft SQL Server; or (ii) a delimited text file database containing the contact information of recipients and sequence identifier 26 for each recipient; or (iii) a data file containing the contact information of recipients and sequence identifier 26 for each recipient; or (iv) a record of previously sent messages (hereinafter referred to as the "message history") stored in their native format within Sender A's text message application 18, and process 2, or otherwise accessible by Sender A; or (v) some other record of, or copy of, the message history that contains the contact information of recipients and sequence identifier 26 for each recipient.

Regardless of whether data source 20 is a traditional database, a data file, or a message history, it is accessible by and interoperable with the other components of the present invention, as described herein.

Data source 20 includes data about the components of previously sent messages from Sender A to text message recipients, and may also include the full or partial text and other data (e.g., multimedia data types) that comprise previously sent messages, including (i) message header fields such as destination address 24, and (ii) the message bodies of previously sent text messages.

Regardless of where data source 20 resides, or whether data source 20 is a traditional database or another form of accessible message history, its purpose is to contain information about previously sent messages, including the addresses 24 of message recipients and sequence identifier 26 for each recipient, or next sequence marker 30 for each recipient, or both sequence identifier 26 and next sequence marker 30 for each recipient.

When used in the present invention, if data source 20 is an accessible message history of previously sent messages, the contact information of recipients and also sequence identifier 26 is retrievable or discernible. For example, by reading the message history, such as those found in a data folder of previously sent messages within text message application 18 or located somewhere else on computing device 12, Sender A (manually) or process 2 (programmatically) could discern what the next sequence marker 30 would be.

Sender A's computing device 12 is a network-16-enabled device such as a desktop or laptop computer, a smartphone, tablet, smart TV, or another type of device. Computing device 12 could be a single device, a server, or a plurality of servers and devices, and is configured as a text message sender and uses text message application 18, and possibly also process 2, to send text messages to clients such as Recipient B. Text message application 18 may reside on the local computing device 12 or a local server, or be accessible via the network 16. Computing device 12 and text message application 18 also have access to a data source 20 (as a database or an accessible message history) that may reside on the local device 12, or a local server, or a local network, or somewhere within the cloud, or on the sender's cellular network 37. Regardless of where data source 20 resides, whether it takes the form of a traditional database or an accessible message history, or how data source 20 components are accessed, data source 20 is operatively coupled to text message application 18.

In any arrangement of data source 20 (as a database or an accessible message history) and text message application 18, computing device 12 is configured to send text message(s) 22 from Sender A to Recipient B, and more particularly between computing devices 12 and 14 which are operated or otherwise controlled by Sender A and Recipient B respectively.

Receiver B's computing device 14 is a network-16-enabled device such as a desktop or laptop computer, a smartphone, tablet, smart TV, or another type of device. Receiver B's computing device 14 has access to text message application 18 which is (i) an application such as Android Messenger, or other application, that resides on computing device 14; or (ii) an internet-based or cloud-based message service such as Apple's iMessage which is accessible by a web browser such as Google Chrome, Microsoft Internet Explorer, Mozilla Firefox, or Safari, or others; or (iii) a hybrid of the foregoing two approaches.

Names of message recipients, destination address(es) 24 and other relevant information about a plurality of contacts are stored in data source 20 (as a database or an accessible message history). Data source 20 is operatively coupled to sequence identifier 26. The function of sequence identifier 26 is to enumerate each text message communication from Sender A to each of Sender A's individual recipient contacts and to maintain a component of data source 20 (as a database or an accessible message history) for each contact, such that every successive message from Sender A to each of its contacts is identified by the next value in a predictable sequence that is intuitively known and understood in the recipients' language and/or culture. In the example in FIG. 1, this predictable sequence consists of the standard Arabic whole numbers, and the number 76 represents the most recent sequence marker from the messages that have previously been sent from Sender A to Recipient B, and in this example the number 77 represents the next sequence marker 30 that would be used in a future message being sent from Sender A to Recipient B.

Since the present invention has been designed to facilitate human recognition and human convenience, in this embodiment Sender A's sequence identifier 26 for its text message correspondence with Recipient B consists of a simple incrementing Arabic numerical sequence. (In the first text message communication from Sender A to Recipient B, a starting message sequence identifier would have to be used. This starting sequence number could be the Arabic numeral 1 or could be another number used to start a sequence.)

Recipient B may notice that the sequence marker for the most recent text message was 76, and that, therefore, the sequence marker for the next legitimate and expected message from Sender A should be 77.

Alternative sequences from the sender's and recipient's language and culture would also operate effectively as other embodiments within the present invention: for example, Roman numerals, an alphabet, or a sequence derived from the words to a familiar poem or song. Another embodiment may utilize multimedia data types in messages, and therefore would be able to expand the range of potential sequence markers significantly: for example, pictures or icons could be used to display a recognizable sequence.

In this embodiment of the present invention, text message senders also use process 2, which is an application or script used in conjunction with text message application 18 to create and send texts to receivers.

Therefore, for the purposes of the present invention, the text message application 18 that creates the characters for a user-accessible header field would execute an alternative process 2 that programmatically inserts an appropriate next sequence marker 30 into one of the fields within the text message. Thus, the next sequence marker 30 becomes embedded within and is part of text message.

Using the next sequential marker 30 means it is easier for Recipient B to quickly and more easily identify a missing text message and request that Sender A re-send the message. The present invention assists its human users in recognizing and understanding the significance of sequence identifier 26 and sequence marker 30 (which in this embodiment are similar to page numbers). Once the human user has recognized or learned of the significance of the sequence identifier(s), no further specialized knowledge is required.

Recipient B may also be assisted in understanding that a text message purporting to be from Sender A but that is lacking either the correct next sequence marker 30 or any sequence marker at all may be a phishing or fraud attempt and should be considered to be suspicious and worthy of further investigation. This assistance could come if some combination of text message application 18, data source 20 (as a database or an accessible message history) and process 2 alerted Recipient B if the next sequential marker 30 that was received as part of text message 22 does not match the expected sequential identifier; that is, if the sequence is out of order. Text message application 18, interoperating with other components, could, for example, change the text message to a different colour, alert Recipient B using an on-screen message on computing device 14, or otherwise provide a notification to Recipient B that a message should be treated as a suspicious message or that a message in the sequence has not been received and is missing.

In another embodiment of the present invention, namely intercepting the text messages at the sender's cellular network 37, the cellular network 37 may insert the next sequence marker 30 if no sequence identifier is detected in a sender's text message, thus providing the network's client base with the means to identify and prevent missing text messages.

In a further embodiment of the present invention, the process of the present invention could be applied to any digital message whatsoever, including any person, entity, or process(es) capable of sending digital messages and embedding the next sequence marker 30 within a user-accessible header field 36 or any other part of the message, include header fields and the body of the message. In these further embodiments of the present invention, authenticity of data sent from a data sender to a receiver is verified and data is flagged as suspicious if the expected sequence number is not received.

Users can use a sequence of numbers (or other computer-recognizable or human-recognizable sequence identifiers) to indicate the order of elements in a sequence, to identify elements in other sequences of data types besides text messages. Numbering the elements in a sequence of data transmissions sent from a data provider to a data receiver can be useful for automated or manual fraud detection (by human overseers or anti-fraud algorithms), data analysis, verifying completeness and integrity of data, making sure no data elements in the sequences have been missed, and for audit purposes. Numbering individual messages in a sequence of digitally encoded coherent signals in packets of data, in data streams (i.e., a sequence of data elements transmitted or made available over time) or sets of data that are transmitted in discrete chunks or batches would be of benefit. As with text messages, the sequence identifiers for other messaging systems could be generated using a database or a history of data received from a data providers. Depending on the data format, the sequence numbering could be stored in an attribute field or header that is transported with and forms part of the data transmission (e.g., packet identifier, data segment identifier, data point identifier, timestamp field, geodata field, subject identifier, any other field or metadata field about the data stream contents), or contained within the raw data of the data stream itself. Examples of data streams are telemetry and diagnostic information from connected devices (Internet of Things), email, financial transactions (including e-commerce transactions), streaming media, health records, text/SMS/MMS messages and information from social media networks.

Having all financial and commercial transactions numbered in a sequence would be similarly beneficial. If a person's most recent purchase on a given day was a cup of coffee at a coffee shop and is numbered as transaction #203 and then if their next purchase of a newspaper at the bookstore is #204 then they should be confident that they are not missing any transactions and that no one is trying to attribute other purchases to them that they did not make. This has the added benefit of verifying that a fraudulent transaction did not take place.

Having all health records numbered in a sequence would be similarly beneficial. The present invention can be adapted to sequentially numbering the individual health records that comprise a patient's cumulative medical file. Currently, doctors and other health service providers study individual records in a patient file based on their chronological presentation; however there is no easy way for the doctor to tell whether any specific record or document is missing, nor where that missing document would occur in the sequence of known health records. If every document, form, record, test result, report, form, prescription, referral, visit log, and paper within a patient file were numbered sequentially, then a doctor or patent could tell if anything is missing (again, like page numbering accomplishes) and this would help ensure that a doctor is able to access a complete record of available information, in chronological order, as it was accumulated. It would benefit records management and general administration to ensure all records are stored in the correct place and that the record is complete and all elements are ordered and tracked accurately. Every new doctor or health professional is helped to have a complete record when they taking on a new client, patient, or case. All that is required is to adapt the text messaging numbering system so as to attach a unique, sequential health record identifier to every record within a patient's cumulative patient file. Anyone reading the file can notice, or a system may automatically notice, when an item is out of order (e.g., a report that should be in another person's file) or may be helped to notice when an item is missing (e.g., the doctor's computer screen could change colour or flash to indicate a missing record).

Social media networks would also benefit from using sequential numbering within social network messages (or "posts") such as tweets in Twitter, posts in Facebook, and messages in Facebook Messenger. In a way similar to how text messages are sequentially identified in the present invention, the system can be adapted to generate the sequence identifier from a database or an accessible message history and then inserting the next sequence identifier within a header field for the message or within the body of the message itself. This makes it easier to identify specific posts, can validate the authenticity of messages/posts (if they contain the correct, predicted sequence ID) and can flag a message/post as suspicious (if the correct sequence ID is not present). If a message is missing, the recipient can ask the sender to re-send the message.

A specific embodiment of the present invention has been disclosed; however, several variations of the disclosed embodiment could be envisioned as within the scope of this invention. It is to be understood that the present invention is not limited to the embodiments described above but encompasses any and all embodiments within the scope of the following claims.

Therefore, what is claimed is:

1. A method of verifying the authenticity of text messages sent from a sender to a recipient, the method comprising the steps of:

- Providing a cellular telecom network configured to deliver text messages between texting devices;
- Providing a text messaging application on a texting device to both the sender and recipient;
- The cellular telecom network and messaging applications configured such that the text messages each have a sender's address, a user-accessible field for receiving content, the content of the user-accessible field being visible to the recipient upon opening the text message in the text message application;
- Identifying the receiver for a text message to be sent by the sender;

generating a current sequence marker for the receiver, the current sequence marker representing a next sequence identifier in a sequence of text messages between the sender and the receiver;

inserting the current sequence marker into the user-accessible field of the text message and then sending the text message to the recipient, and wherein the sender queries a text history to generate the current sequence marker, the text history representing a record of text messages previously sent from the sender to the recipient, the sender then inserting the current sequence marker into the user accessible field before sending the text message.

2. The method of claim 1 wherein the current sequence marker comprises one or more characters selected from the group of sequential characters comprising letters, numbers, words from a sequential list of words, symbols from a sequential list of symbols, icons from a sequential list of icons and images from a sequential list of images.

3. The method of claim 1 wherein the text history is contained in a database coupled to the text message application.

4. The method of claim 3 wherein the database and first text message application are configured to programmatically generate the current sequence marker and insert it into the user-accessible field before sending the text message.

5. The method of claim 3 wherein the databases coupled to the sender and receiver text message applications contains fields for the contact information of senders and recipients, the last sequence identifier used in a sequence of text messages, the current next sequence identifier to be used for the next text message in the sequence of messages, the databases being further configured to automatically update the current sequence identifier in the sender database to reflect the sending of the text message when the text message is sent from the sender, and to automatically update the predicted sequence identifier in the receiver database in the event the sequence identifier extracted from the text message received matches the predicted sequence identifier fetched from the receiver database.

6. The method of claim 1 wherein the text history includes a last sequence marker for a last text message sent to the recipient, the sender generating the current sequence marker by incrementing the last sequence marker by 1.

7. The method of claim 1 further comprising the steps of the recipient receiving the text message sent by the sender, the current sequence marker being identified from the text message, the current sequence marker then being compared to an expected sequence marker predicted from the last sequence marker, the text message being flagged as suspicious if the current sequence marker identified from the text message does not match the expected sequence marker.

8. The method of claim 1 wherein the current sequence marker is a human-readable alphanumeric sequence of characters.

* * * * *